United States Patent

Demler, Sr. et al.

[15] 3,640,552
[45] Feb. 8, 1972

[54] VACUUM OR PRESSURE COUPLING DEVICES

[72] Inventors: Henry William Demler, Sr., Lebanon; Edward Landis Weist, Hershey, both of Pa.

[73] Assignee: AMP Incorporated, Harrisburg, Pa.

[22] Filed: Dec. 21, 1970

[21] Appl. No.: 99,858

Related U.S. Application Data

[60] Division of Ser. No. 858,241, Aug. 13, 1969, Pat. No. 3,588,149, which is a continuation-in-part of Ser. No. 690,896, Dec. 15, 1967, abandoned.

[52] U.S. Cl. ..........................285/110, 285/137 R, 285/319, 285/DIG. 22
[51] Int. Cl............................................................F16l 39/00
[58] Field of Search..................285/110, 137, DIG. 22, 319, 285/331

[56] References Cited

UNITED STATES PATENTS

| | | | |
|---|---|---|---|
| 530,951 | 12/1894 | La Pointe | 285/137 R |
| 2,701,147 | 2/1955 | Summerville | 285/137 X |
| 3,093,397 | 6/1963 | Yancey | 285/137 R |
| 3,453,007 | 7/1969 | Roland | 285/137 R |
| 3,455,579 | 7/1969 | Olliff, Jr. et al. | 285/319 X |
| 3,469,863 | 9/1969 | Riester et al. | 285/137 R |

FOREIGN PATENTS OR APPLICATIONS

| | | | |
|---|---|---|---|
| 338,462 | 11/1930 | Great Britain | 285/137 R |
| 376,732 | 5/1964 | Switzerland | 285/DIG. 22 |

*Primary Examiner*—Thomas F. Callaghan
*Attorney*—William J. Keating, Ronald D. Grefe, Gerald K. Kita, Jay L. Seitchik and John P. Vandenburg

[57] ABSTRACT

A vacuum or pressure coupling device comprises mateable body members each provided with means for connection to tubular members and each provided with means for maintaining the body members in engagement, one of the body members being provided with a stiffly flexible sealing member which is sealingly and telescopically mateable with a section of another of the body members.

4 Claims, 15 Drawing Figures

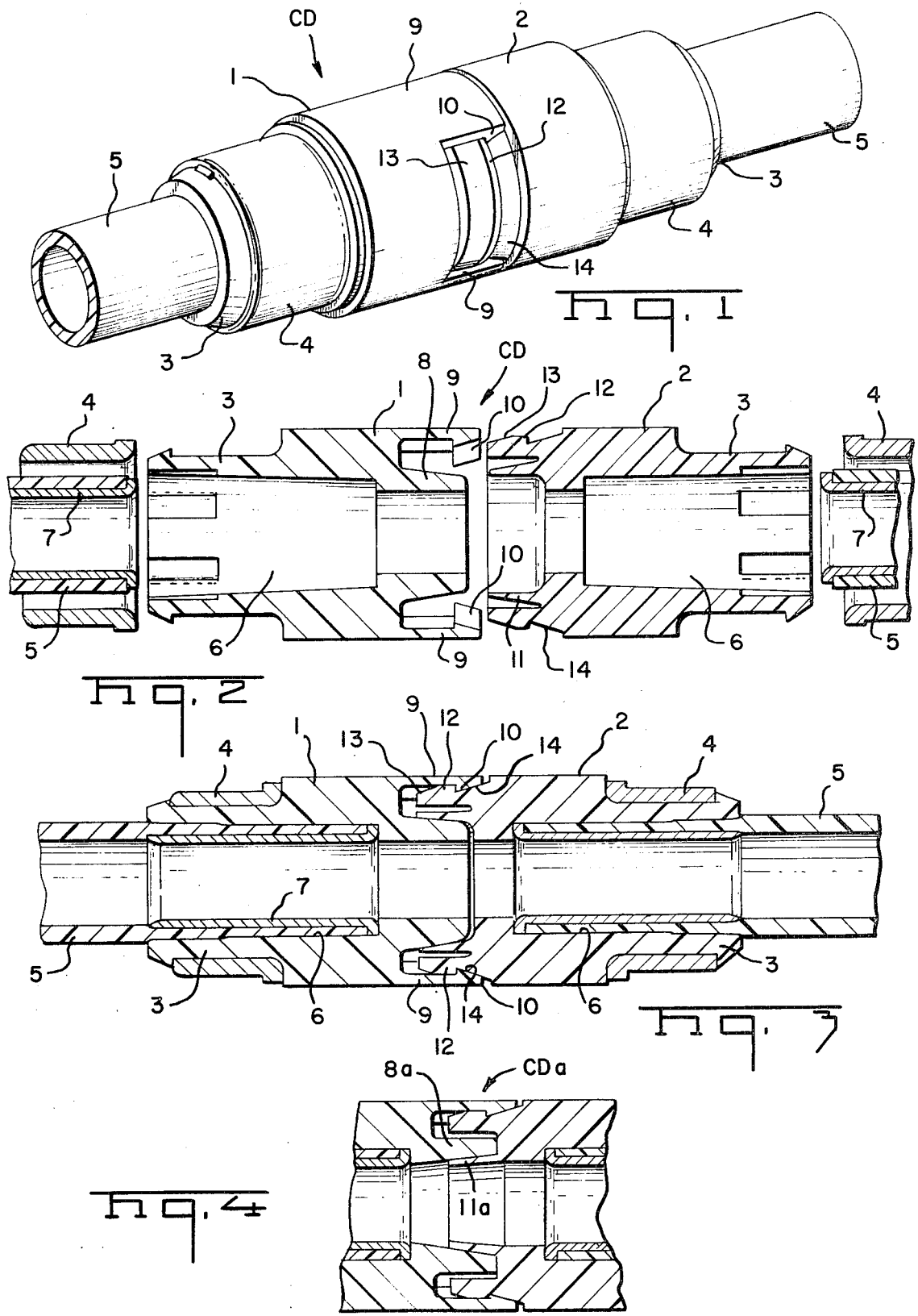

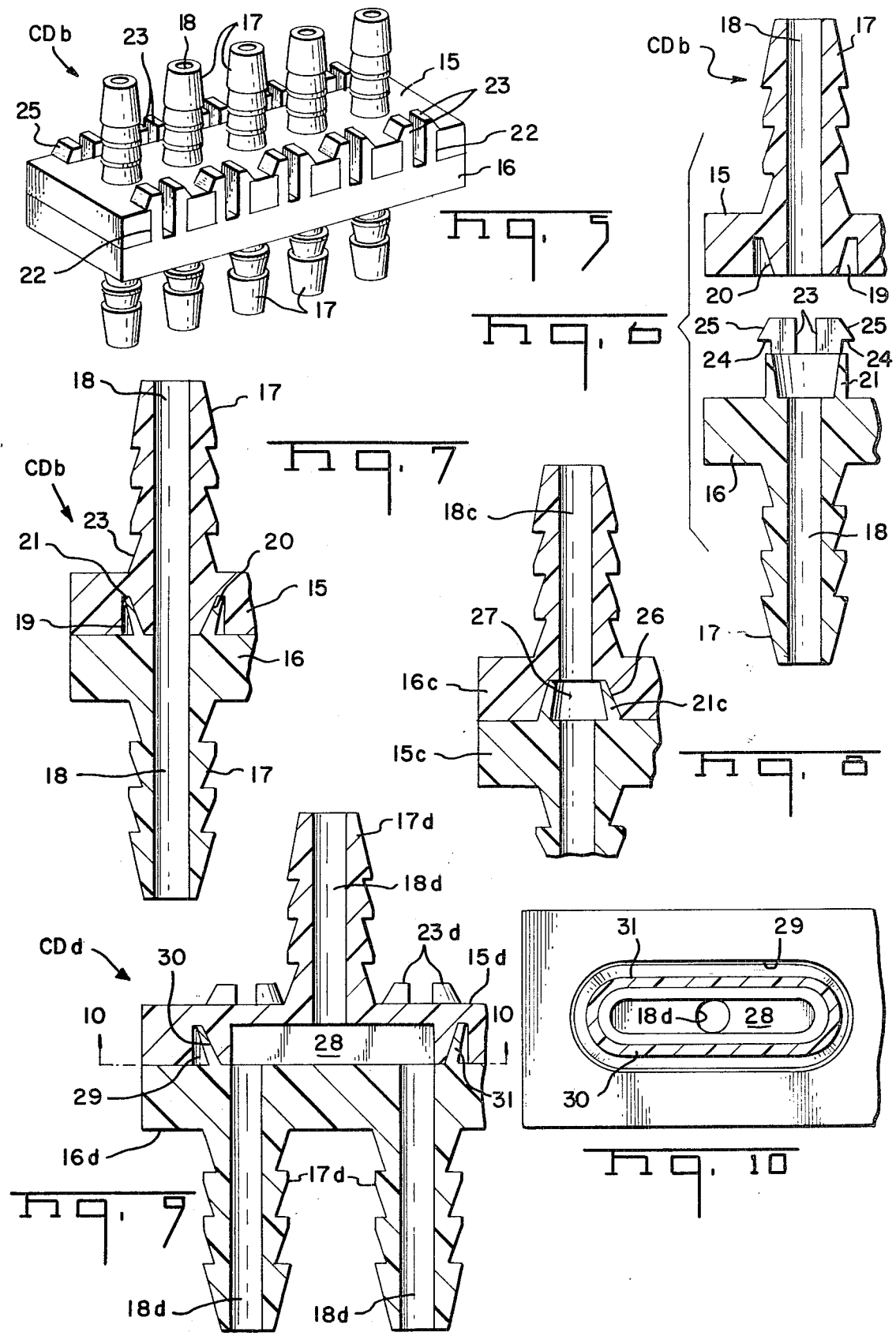

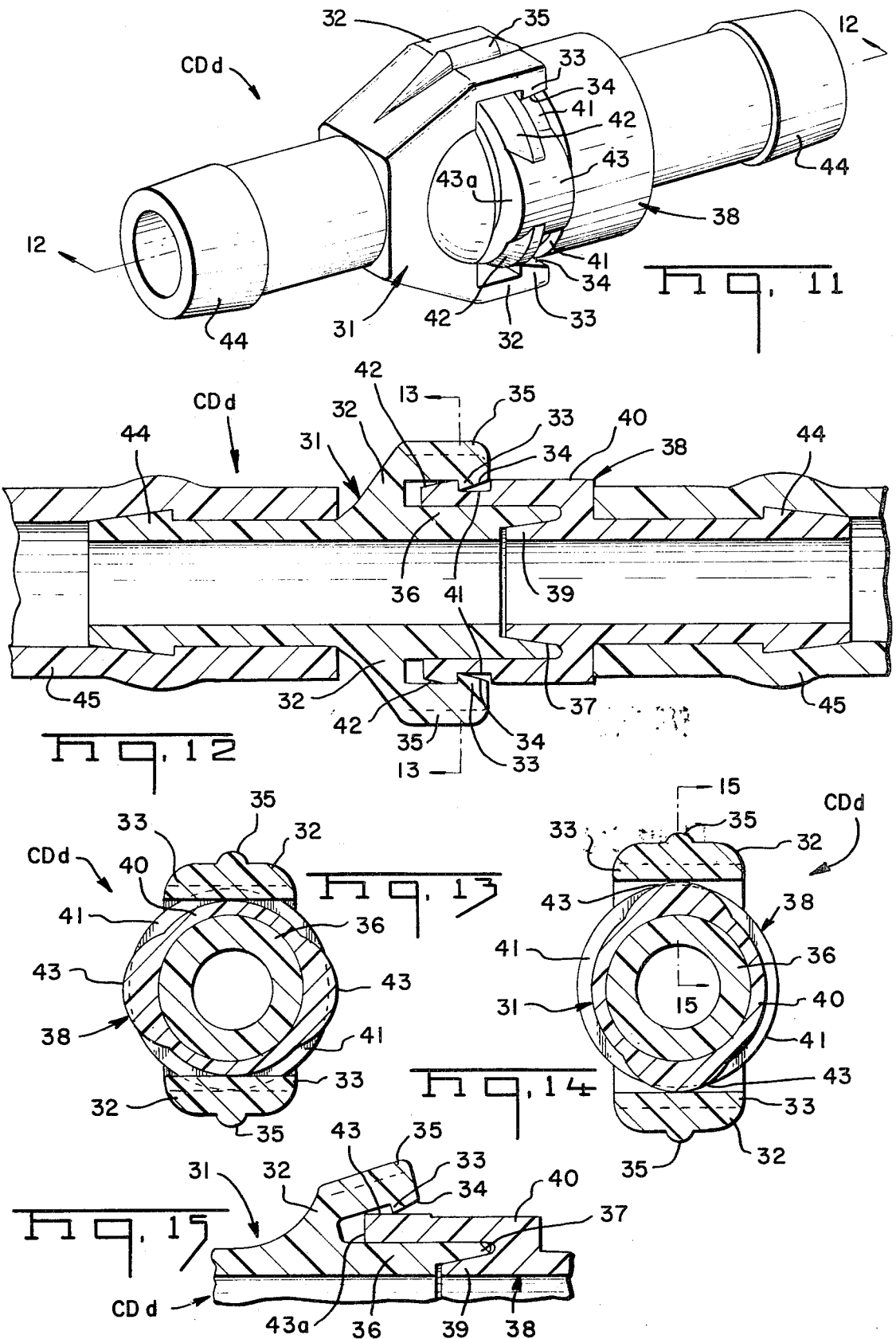

VACUUM OR PRESSURE COUPLING DEVICES

CROSS REFERENCE TO RELATED APPLICATION

This application is a divisional application of application Ser. No. 858,241, filed Aug. 13, 1969, and now U.S. Pat. No. 3,588,149 which in turn is a continuation-in-part application of Ser. No. 690,896, filed Dec. 15, 1967, and now abandoned.

This invention relates to coupling devices for connecting tubular members together and more particularly to coupling devices for connecting vacuum or pressure lines.

In the field of vacuum or pressure lines they are generally connected to a source of vacuum or pressure by coupling devices of complicated construction which can be a permanent connection or a quick-disconnect connection. Such coupling devices include several pieces to effect the connection and they are expensive.

An object of the present invention is to provide a vacuum or pressure coupling device having telescopically mateable parts with one of these parts being a stiffly flexible sealing means.

Another object of the invention is the provision of a vacuum or pressure coupling device having means to sealingly maintain the parts together and to permit the parts to be readily separated.

A further object of the invention is to provide a vacuum or pressure coupling device having multiple inlets in communication with respective outlets.

An additional object of the invention is the provision of having integral sealing means.

Still a further object of the invention is to provide a vacuum or pressure coupling device having means for latching parts of the coupling device together in a simple manner without the aid of intricate latching devices and/or tooling.

Still an additional object of the invention is the provision of a vacuum or pressure coupling device having a construction defining a manifold.

Other objects and attainments of the present invention will become apparent to those skilled in the art upon a reading of the following detailed description when taken in conjection conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

In the drawings:

FIG. 1 is a perspective view of a vacuum coupling device with parts in position;

FIG. 2 is a cross-sectional view of the elements of FIG. 1 in an unassembled condition;

FIG. 3 is a longitudinal cross-sectional view of FIG. 1;

FIG. 4 is a partial cross-sectional view similar to FIG. 3 illustrating an alternative embodiment;

FIG. 5 is a perspective view of another embodiment;

FIG. 6 is an exploded and partial cross-sectional view of the elements of FIG. 5;

FIG. 7 is a view similar to FIG. 6 with the elements in engagement;

FIG. 8 is a partial cross-sectional view of an additional embodiment;

FIG. 9 is a partial cross-sectional view of a further embodiment;

FIG. 10 is a view taken along lines 10—10 of FIG. 9;

FIG. 11 is a perspective view of a further embodiment;

FIG. 12 is a view taken along lines 12—12 of FIG. 11 with the coupling device connected to tubular members;

FIG. 13 is a view taken along lines 13—13 of FIG. 12 illustrating the coupling device in a coupled position;

FIG. 14 is a view similar to FIG. 13 illustrating the coupling device in a position for decoupling; and FIG. 15 is a view taken along lines 15—15 of FIG. 14.

Turning now to the drawings and especially FIGS. 1 through 3, a vacuum coupling device CD comprises mateable body members or parts 1 and 2. Each part is provided with a section 3 on which ferrule 4 is disposed which is reduceable in diameter when the ends of tubular members 5 are positioned within openings 6 of parts 1 and 2 to secure sections 3 to the ends of the tubular members. Section 3, ferrules 4, and the configuration of openings 6 correspond to securing means for securing onto the ends of tubular members which is completely disposed in applicant's copending application, Ser. No. 517,747 filed Dec. 30, 1965, and assigned to the present assignee.

If tubular members 5 are plastic material or soft metal, inserts 7 are preferably disposed therein in order to provide backup pressure when ferrules 4 are reduced in diameter. If, on the other hand, tubular members 5 are of hard material, no inserts are necessary. Other means for securing parts 1 and 2 onto tubular members other than that disclosed can, of course, be used to secure the parts to the tubular members such as, for example, barbed sections for insertion into the ends of rubber hoses.

Part 1 is provided with an annular member 8 having a tapered exterior surface. Stiffly flexible latching legs 9 extend outwardly from the same end from which annular member 8 extends and they are spaced outwardly from annular member 8 as well as therealong. Latching legs 9 have an arcuate configuration in cross section and they are provided with inwardly directed latching members 10 which are provided with a beveled surface.

Part 2 is provided with an integral stiffly flexible sealing member 11 which is telescopically and sealingly mateable with annular member 8 when parts 1 and 2 are latchably mated as illustrated in FIG. 3. Sealing member 11 is tapered in cross section with the thinnest part thereof being at the outermost end of the sealing member. Concentric with sealing member 11 is an annular hood 12 having a beveled surface 13 and an annular depression 14.

In assembly, parts 1 and 2 are pushed together in an axial direction with annular member 8 being telescopically disposed within sealing member 11 and the outer beveled surfaces of latching members 10 are cammed over beveled surface 13 of annular hood 12 until latching member 10 latchably engage annular depression 14 thereby sealingly latching parts 1 and 2 together as illustrated in FIG. 3. Since sealing member 11 is tightly engaged with the outer tapered surface of annular member 8 and tubular members 5 are connected to a vacuum environment, sealing member 11 is drawn tightly against annular member 8 as a result of the vacuum environment thereby rendering the seal between sealing member 11 and annular member 8 more effective.

Since depression 14 is annular, latching members 10 engage therewithin at any position therearound thereby precluding any specific areas of engagement between parts 1 and 2. In order to disconnect parts 1 and 2 from one another, force is applied at right angles to the axis of parts 1 and 2 thereby causing latching legs 9 to be disengaged from annular depression 14 via a camming action so that the parts can now be disengaged from each other.

FIG. 4 illustrates coupling device CDa which is similar in construction to coupling device CD except that coupling device CDa is used in a pressure environment instead of a vacuum environment. Annular member 8a of FIG. 4 has the interior surface tapered and stiffly flexible sealing member 11a is arranged so as to be snugly disposed in a telescopic manner within the inner tapered surface of annular member 8a and the pressure of the fluid presses sealing member 112 tightly against the tapered surface of annular member 8a thereby rendering the seal therebetween more effective. The rest of coupling device CDa is otherwise similar in construction to coupling device CD and no further discussion of coupling device CDa is necessary.

FIGS. 5 through 7 illustrate coupling device CDb which is another embodiment. This embodiment includes part 15 which is mateable with part 16. Both parts are in the form of plates provided with barbed sections 17 onto which hoses are sealingly secured. Barbed sections 17 are provided with openings 18 extending therethrough. Annular depressions 19 are disposed in part 15 concentric with each opening 18 and the inner wall 20 of each annular depression 19 is tapered so that each opening 18 in part 15 has an annular section similar to annular section 8. Stiffly flexible sealing members 21 extend outwardly from part 16 concentric with each of openings 18. Sealing members 21 are tapered and are telescopically mateable within respective annular depressions 19 of part 15 and they are sealingly engageable with inner walls 20 when parts 15 and 16 are brought into engagement. Coupling device CDb is used in conjunction with a vacuum source which forces sealing members 21 into tight engagement with inner walls 20 thereby providing an effective seal therebetween.

Recesses 22 are disposed in each side of part 15 at spaced intervals therealong. A pair of integral latching legs 23 extend outwardly from part 16 at spaced locations therealong corresponding to the spacing of recesses 22. Latching legs 23 are stiffly flexible and are provided with latching sections 24 and tapered configurations provided by beveled surfaces 25. Latching legs 23 are spaced apart a distance so that the distance between the outer surfaces corresponds to the width of recesses 22 in order to be fittable therein.

When parts 15 and 16 are moved into engagement with each other they are latched together via pairs of latching legs 23 mateable with respective recesses 22 as illustrated in FIG. 5. Beveled surfaces 25 cause latching legs 23 to be moved toward each other during the movement of latching legs 23 along recesses 22, and when parts 15 and 16 come into engagement, latching sections 24 engage the top surface of part 15 under the influence of the spring characteristics of latching legs 23 thereby latchably securing parts 15 and 16 together without the aid of any tools or extra securing members; however, other securing means such as, for example, screws, nuts, and bolts or the like, may, of course, be used to secure parts 15 and 16 together.

FIG. 8 illustrates coupling device CDc which is similar in every respect to coupling device CDb except that a stiffly flexible sealing member 21c is sealingly forced against tapered wall 26 of an enlarged section 27 of opening 18c when parts 15c and 16c are secured together. When coupling device CDc is to be used in conjunction with a pressure environment so that the pressure of the fluid will force sealing member 21c against tapered wall 26, the embodiment of FIG. 8 is therefore similar to the embodiment of FIG. 4 and enlarged section 27 and tapered wall 26 constitute an annular section similar to annular section 8a.

FIGS. 9 and 10 illustrate coupling device CDd which is a still further embodiment of the invention. Coupling device CDd is similar in construction to coupling device CDb except that the opening 18d of a barbed section 17d is in communication with enlarged recess section 28 which is oblong in configuration. Surrounding enlarged section 28 is a concentric manner is an oblong depression 29 having an inner tapered wall 30. Stiffly flexible sealing member 31 has an oblong configuration surrounding in a concentric manner openings 18d of barbed sections 17d on part 16d. When parts 15d and 16d are latchably secured together via latching legs 23d, sealing member 31 is disposed in oblong depression 29 snugly against tapered wall 30 and openings 18d of part 16d are in communication with enlarged section 28 so that two openings of part 16d are in communication with one opening of part 15d in a vacuum environment. Thus, barbed sections 17d of part 15d is connected to a source of vacuum while barbed sections 17d on part 16d are connected to members to be operated by a source of vacuum. Of course, more than two openings of 18d can be in communication with a single opening in accordance with the teaching of the present invention. Stiffly flexible sealing member 31 can be biased against a tapered wall in the manner of the embodiments of FIGS. 4 and 8 in order to be used in conjunction with fluid under pressure and this need not be illustrated, since such construction can be readily visualized when considering the embodiments of FIGS. 4, 8, 9 and 10.

FIGS. 11-15 illustrate coupling device CDd which is a still additional embodiment of the invention and it is similar in configuration to coupling device CD, FIGS. 1-4. Stiffly flexible latching legs 32 of body member 31 are provided with inwardly directed latching members 33 each of which has a beveled surface 34. A rib 35 is provided on each leg 32 to strengthen same. A tubular section 36 is spaced inwardly from legs 32 and it extends outwardly beyond these legs, a tapered sealing surface 37 being located along an outer end thereof.

Body member 38 is provided with a flexible sealing member 39 and a tubular section 40 concentric therewith. Diametrical latching grooves 41 are provided in section 40 which receive latching members 33 of latching arms 32 to maintain tubular sections 36 and 40 telescopically mated so that sealing surface 37 and sealing member 39 are maintained in sealing engagement. Arcuate beveled surfaces 42 are located at the front end of body member 38 to be engaged by beveled surfaces 34 of latching members 33 when members 31 and 38 are axially moved together and this action causes arms 32 to be cammed outwardly thereby facilitating latching members 33 seating within latching grooves 41 to securely latch members 31 and 38 together.

Arcuate projections 43 are disposed in a diametrical manner on body member 38 and they are in communication with groove 41. Projections 43, when engaged by latching members 33 upon members 31 and 38 being rotated relative to one another, effect a camming operation thereby moving latching arms 32 away from the longitudinal axis of members 31 and 38 and freeing latching members 33 from grooves 41 and this action permits members 31 and 38 to be moved free of each other. Projections 43 extend slightly above the outside surface of section 40 to assure that latching members 33 are moved free and clear of grooves 41 so that members 31 and 38 can readily be moved free of one another. The configuration of projections 43 is such that the members 31 and 38 can be rotated in either direction.

The thickness of the section of tubular section 36 containing sealing surface 37 is such that it is wedgingly disposed between the inside surface of tubular section 40 and stiffly flexible sealing member 39 thereby effecting an excellent seal therebetween especially under a pressure environment. An arrangement such as illustrated in FIGS. 1-3 can be utilized in the case of a vacuum environment.

Barbed sections 44 are provided by members 31 and 38 in order to connect to flexible tubular members 45; however, the tubular members 45 can be connected to members 31 and 38 via the teaching of FIGS. 1-3, if desired.

Projections 43 are provided with flat surfaces 43a at the front ends thereof to prevent the body members from being engaged in a manner so that latching members 33 are disposed on projections 43 which is a nonlatching position.

It will, therefore, be appreciated that the aforementioned and other desirable objects have been achieved; however, it should be emphasized that the particular embodiments of the invention, which are shown and described herein, are intended as merely illustrative and not as restrictive of the invention.

What is claimed is:
1. A coupling comprising:
   first and second plates in mating engagement along abutting surfaces,
   each of said plates having integral projecting sections provided with barbed means for respective attachment to tubular members,
   each of said plates having openings extending therethrough, which openings also extend through respective barbed sections for communication with the interior of said tubular members,
   said openings of said first plate being in communication with corresponding openings in the other of said plates, said abutting surface of said first plate being absent of projecting portions and having depressions defining tapered walls, each of said walls encircling at least one of said openings, said abutting surfaces encircling each of said depressions, said second plate having stiffly flexible relatively thin sealing means projecting from said abutting surface of said second plate and being inserted within said depressions of said first plate and in sealing registration with respective tapered walls, said sealing means being unitary with said second plate, said first plate having a plurality of recesses, and said second plate having a plurality of projecting pairs of resilient latching legs, each of said latching legs having a beveled surface latching section of tapered configuration, each pair of said latching legs being received in a recess of said first plate with said latching sections received through said first plate and retaining said first and second plates in mating engagement.

2. The structure as recited in claim 1, wherein, said first plate includes an enlarged recess section communicating with one of said openings, one of said resilient sealing means surrounding said recess section, and at least two of said openings in said second plate in communication with said recess section.

3. The structure as recited in claim 1, wherein at least one of said openings of said first plate is in communication with a corresponding depression, and said projecting resilient sealing means is received interiorly of said depression.

4. The structure as recited in claim 1, wherein at least one of said depressions is in spaced encircling relationship with respect to one of said openings, and one of said tapered walls is in encircling relationship around said one of said openings, and said resilient projecting sealing means is received interiorly of said one depression.

* * * * *